H. BAXTER.
REVOLVING GRAIN BUNDLE SHOCKER.
APPLICATION FILED AUG. 4, 1917.
1,335,419.
Patented Mar. 30, 1920.
3 SHEETS—SHEET 3.
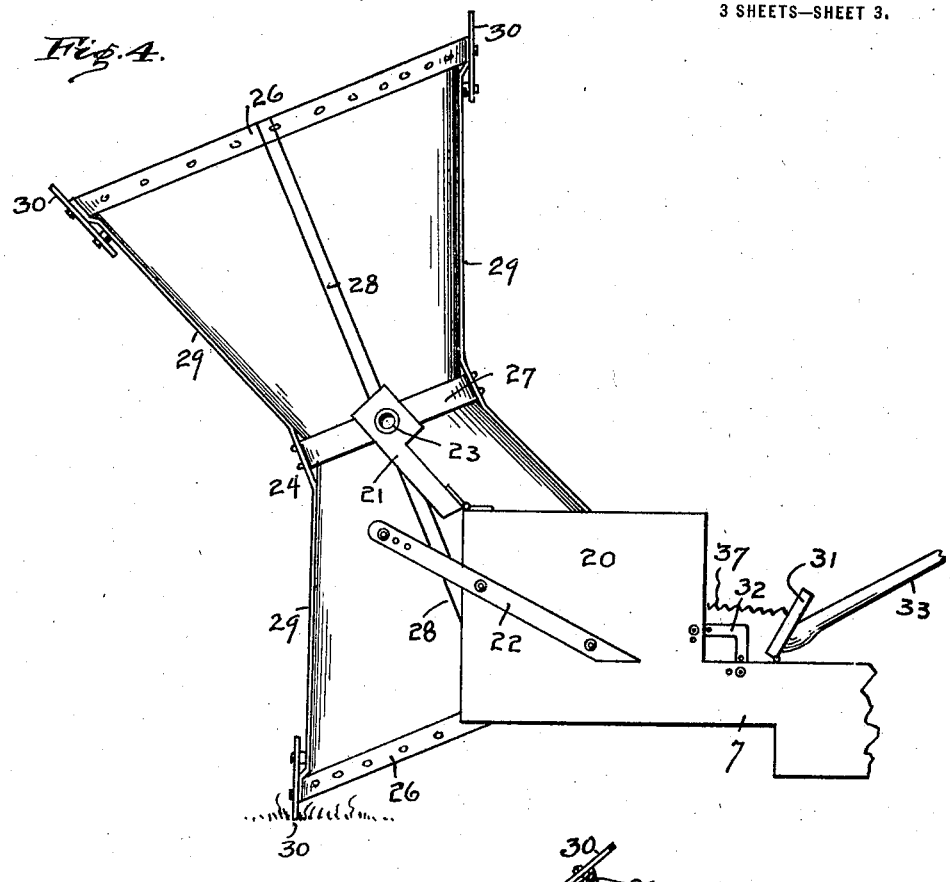
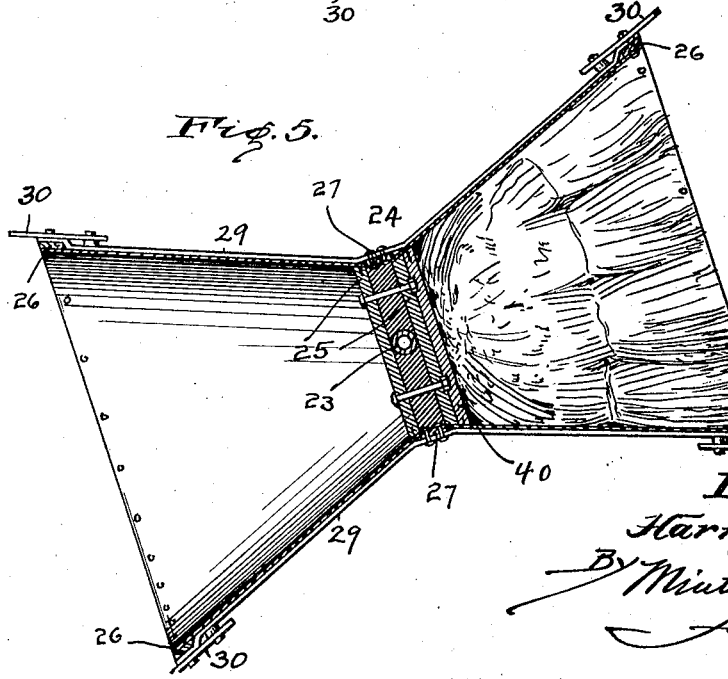
Inventor,
Harry Baxter,
By Minturn & Werner,
Attorneys.

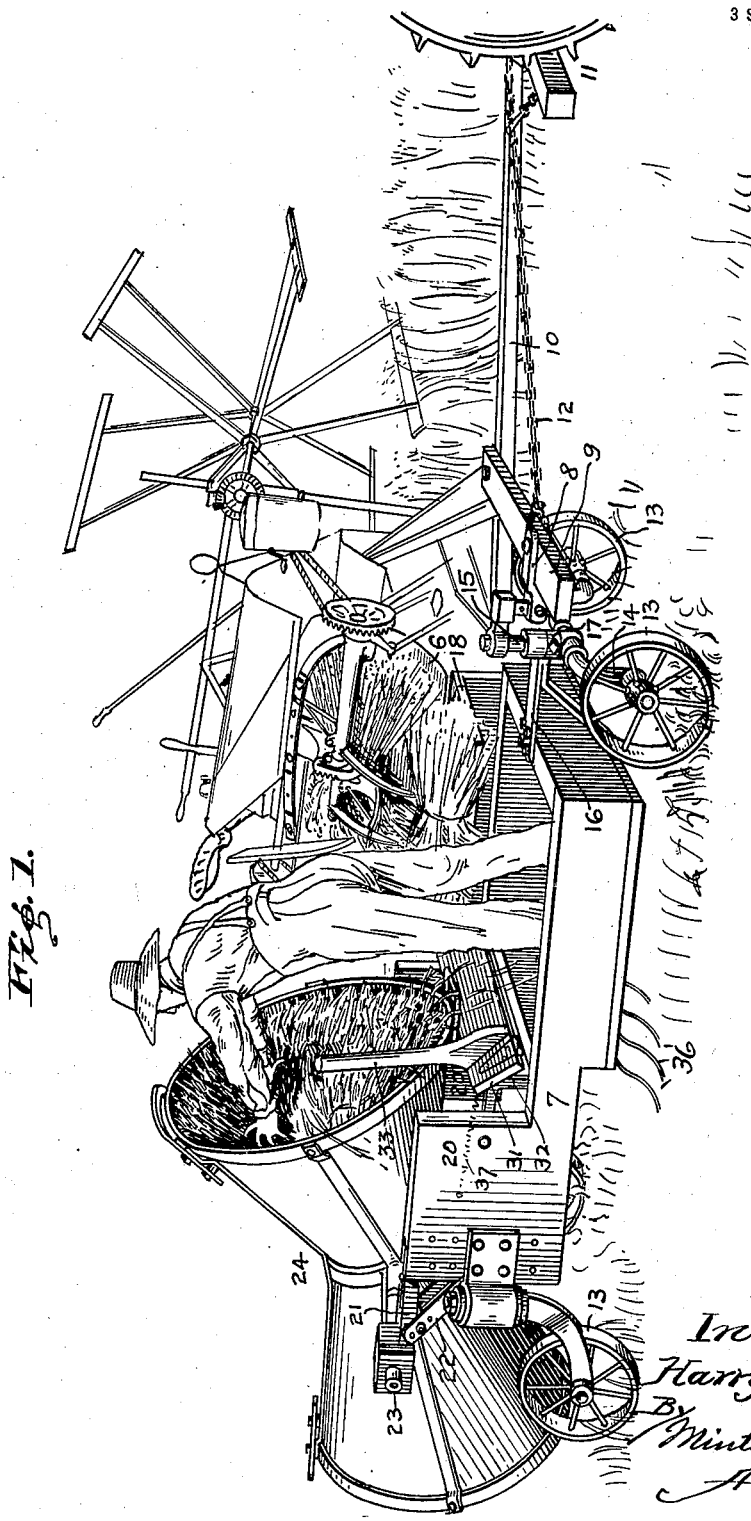

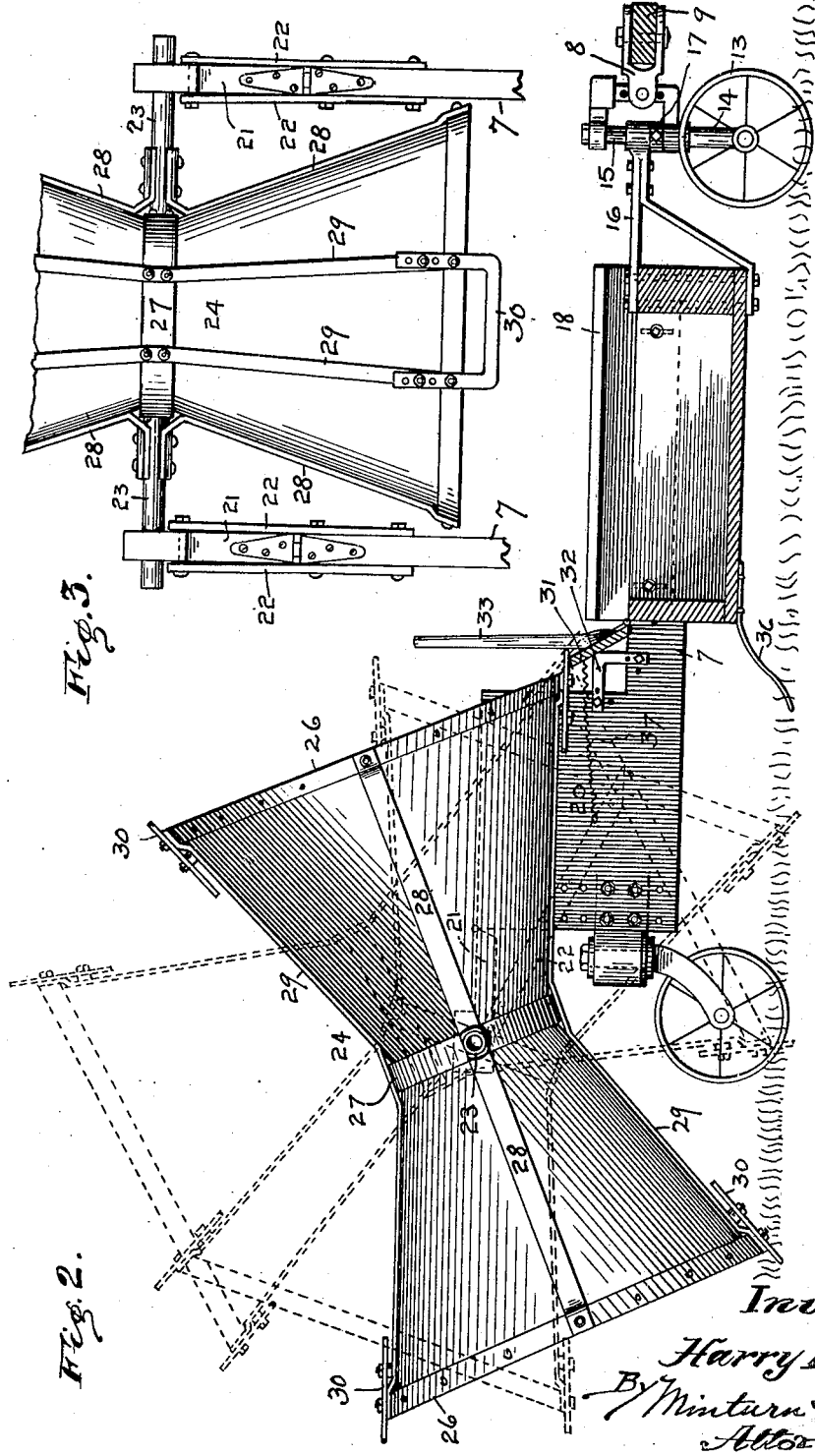

UNITED STATES PATENT OFFICE.

HARRY BAXTER, OF NEWMAN, ILLINOIS.

REVOLVING GRAIN-BUNDLE SHOCKER.

1,335,419.  Specification of Letters Patent. Patented Mar. 30, 1920.

Application filed August 4, 1917. Serial No. 184,430.

*To all whom it may concern:*

Be it known that I, HARRY BAXTER, a citizen of the United States, residing at Newman, in the county of Douglas and State of Illinois, have invented certain new and useful Improvements in Revolving Grain-Bundle Shockers, of which the following is a specification.

Under the prevailing methods in harvesting small grains such as wheat, oats, rye and the like, the crop is cut and bound into sheaves and the latter are discharged separately from the binder to be formed into shocks by laborers who follow on foot behind the binder. Two and three men are required to shock as fast as a binder discharges the sheaves and in their efforts to keep up with the machine the shocks are often improperly formed and will not shed water from rains, and often at quitting time at night the shockers are so far behind the binder that a multitude of sheaves are left on the ground unshocked and exposed to the damages of a sudden rain. Also, with hand shocking methods as above described the grain which shatters off of overripe heads falls to the ground in handling and is lost.

The object of this invention is to provide means whereby a single operator riding in my device, which is readily attached to any of the commercial types of binders, will gather the sheaves and form them into shocks of compact and uniformly perfect shape, keeping up with the maximum speed of the binder, and discharge the shocks in a stable upright position on the ground as fast as they are formed.

The object also is to deposit the loose and shattered grain in the shock where it will be saved.

A further object is to provide a simple and inexpensive device which will not materially add to the draft of the harvester as a whole, but will even up the side draft which every binder has, and which will be easy to disconnect from the latter for moving from one field to another.

I accomplish the above and other objects which will hereinafter appear, by the mechanism illustrated in the accompanying drawings, in which—

Figure 1 is a perspective view of a binder with my invention shown in operative position attached thereto. Fig. 2 is a longitudinal vertical section of the carriage portion of my invention showing the shock-formers in side elevation, ready to be filled, in full lines, and in two of its positions for dumping, in dotted lines. Fig. 3 is a fragment showing a portion of the shock-former and its supporting members in top plan view. Fig. 4 is a side elevation of the shock-former in one of its positions preliminary to dumping a shock, wherein its trunnions are raised above their normal bearings, and Fig. 5 is a longitudinal central section of the shock-former with a formed shock in its upper end.

Like characters of reference indicate like parts throughout the several views of the drawings.

Referring to Fig. 1, it will be noted that my invention is attached opposite that side of a binder from which the sheaves are dropped from the slideway 6. The frame 7 of my device is mounted on wheels which afford freedom of movement in all directions, and is connected by means of a clevis 8 with a draft-bar 9 bolted at one end to the tongue 10 of the binder and connected near its other end with the tongue or a portion of the tractor 11, by means of a diagonal stay-chain 12. The latter may be a cable or wire or other suitable tie. The two front wheels 13, 13, are on an arched axle 14, from the middle of which is an upwardly projecting rectangular frame comprising a shaft 15. The frame is adjustably connected with the clevis 8. The shaft 15 passes through a vertical sleeve on the front end of a bracket 16, from frame 7, and the height of the sleeve on the shaft is determined by the position on the latter of a sleeve 17, which is retained by a set screw. This adjustment, with the one at the clevis, enables the front end of the frame 7 to be changed to suit the conditions of the crop harvested.

The front end of the frame, which frame is comprised of a pair of parallel members extending in the direction of travel of the binder and a transverse front end member and a middle member parallel to said front member, is floored between said transverse members to support the standing operator.

This floor will preferably be lowered as shown so the operator can reach the bundles or sheaves coming from the binder without stooping; and to make said delivery more convenient a raised shelf 18 is provided to receive the sheaves until the operator is ready for them. This shelf is supported by a riser having vertical slots through which bolts are passed into frame 7, whereby the shelf is made adjustable.

The rear ends of the side frame-members are extended upwardly to form risers 20, 20, to the upper rear corners of which the respective arms 21 are hinged. Each arm bears by gravity upon a cross-bolt supported by a pair of metal straps 22, supported by the frame 7 as shown clearly in Fig. 3. The metal straps have a series of bolt-holes whereby the positions of the cross-bolts may be changed to vary the height at which the arms 21 are held. At the rear ends of the arms 21 are respective boxes in which the trunnions 23 of a shock-former 24 are journaled. The trunnions are preferably the projecting ends of a single shaft passing through the shock-former. The latter comprises a pair of hollow conical frustums placed with their small ends together adjacent said shaft. The inner ends are closed by wooden heads 25 (see Fig. 5), to which the sides which are of sheet metal, are nailed. The heads are separated a distance equal to the diameter of the shaft and the space on each side of the shaft is filled with any suitable ballast which will bear down on a shock contained in one of the frustums, by virtue of the weight of the ballast and shock former. The outer open ends of the hollow frustums are reinforced by heavy metal bands 26, to which the sheet metal sides are appropriately secured, and a strap-iron band 27 surrounds the joint between the two frustums.

Metal straps 28 extend outside of the frustums from bands 26, to the shaft. The inner ends are bent in the manner shown in Fig. 3 and are riveted to the shaft, and the outer ends of the straps are riveted to the bands 26. Additional straps 29, in pairs, are located midway between the straps 28, and are riveted to bands 26 and 27. U-shaped gripping bars 30, to enter the ground when the shock-former is rotated, are secured at diametrically opposite portions of the frustums as shown, and are adjustable in the extent of their projection by reason of a series of bolt-holes provided for that purpose.

Hinged to the middle transverse frame-member is a board 31, which is swung to the rear against adjustable strap-metal angles 32, in which position it is in the path of rotation of the shock-forming frustums and holds the adjacent one, which is the uppermost one, from dropping down while it is being filled with sheaves and a shock formed therein. The board 31 has a handle 33 for its manipulation.

The rear end of the frame 7 is preferably supported on caster-wheels 13, 13, adjustable vertically by changing the bolts which attach brackets 41 to frame 7 to raise and lower the frame.

The operation of my device is as follows: Assuming the shock-former to be in the position shown in Figs. 1, 2 and 5, the operator standing on the floor at his station in front, takes the sheaves, one at a time, as they are deposited from the binder on platform 18, and arranges them in the hollow frustum closest to him, with the heads in and butts out, in a solid, compact mass. When it is desired to top the sheaf with a cap, the first sheaf inserted in the frustum is appropriately spread at its base and the other sheaves to comprise the shock are inserted against the spread one. When the hollow frustum is full the support 31 is swung out of the path of the shock-former by manipulation of handle 33, and thereupon the loaded frustum will drop down by gravity bringing its gripping-bar 30 into contact with the ground. As the machine moves forward the shock-former will turn to a vertical position on bar 30 as a pivot, and the weight of the former will compress the sheaves together forcing their butts into the stubble. The conical frustum will then turn on the diametrically opposite bar 30 as a fulcrum and will withdraw from the shock, leaving it standing on the ground in a compact perfectly formed condition.

All of the loose grain is deposited in the frustum as it is loaded, and remaining in the shock it is deposited with the sheaves in the threshing machine later on.

Wire fingers 36 at the rear end of the operator's floor aid in keeping the sheaves from falling out of the frustum during the lowering of the latter. I have also found it desirable to provide a spring 37 to automatically hold the board 31 in position to support the frustum. This, of course, requires that the member 31 be held out of the path of the frustum by hand when the latter is moving to dumping position. The angle of the sides of the cone of the frustums should be approximately the same as shown to cause same to release the shock properly when the latter is dumped.

For short grain where the normal depth of the frustums is too great it will be reduced by inserting one or more false ends 40.

While I have described my invention with more or less minuteness as regards details of construction and arrangement and as being embodied in certain precise forms, I do not desire to be limited thereto unduly or any more than is pointed out in the claims. On the contrary, I contemplate all proper changes in form, construction and arrangement, the omission of immaterial elements and the substitution of equivalents as circumstances may suggest or as necessity may render expedient.

I claim:

1. In a grain shocker, a pivotally mounted unit structure comprising a pair of hollow conical frustums having a common longitudinal axis and open at their larger ends, means for rigidly connecting the smaller closed ends of the frustums together, means forming a common pivot for swingingly supporting said frustums, and operable means for holding the unit structure with one of the larger ends of a frustum uppermost during the operation of filling it.

2. In a grain shocker, a pivotally mounted unit structure comprising a pair of hollow conical frustums having a common longitudinal axis and open at their larger ends, means for rigidly connecting the smaller closed ends of the frustums together, means forming a common pivot for swingingly supporting said frustums, means for releasing the unit structure when the uppermost frustum is filled, and means for engaging the ground and for dumping the contents of the filled frustum as the binder moves forward.

3. In a grain shocker a pair of hollow conical frustums having a common longitudinal axis and open at their larger ends and rigidly connected at their closed smaller ends, a forwardly moving support, pivotal means for connecting the frustums with the support said means being vertically adjustable to allow the frustums to rotate endwise and to contact at their ends with the ground, and means for temporarily holding the frustums oblique to the ground while one of them is being loaded.

4. In a shocker for grain binders, a frame supported on wheels, a pair of hollow conical frustums having a common longitudinal axis and open at their larger ends and rigidly connected at their smaller ends which are closed said frustums as a unit having middle pivots, arms hinged to the frame having bearings for said pivots, means to limit the downward swing of the arms and removable means to temporarily arrest the rotation of the frustums on their pivots.

5. The combination with a grain binder, of a frame supported on wheels, means for removably attaching the frame to the binder, a pair of hollow conical frustums having a common longitudinal axis and open at their larger ends and rigidly joined at their smaller closed ends, adjustable means for pivotally supporting the frustums from the frame, and means manually regulated for contacting the frustums with the ground to rotate them on their pivots.

6. The combination with a grain binder, of a frame supported on wheels and having a floor for an operator to stand on, means for removably attaching the frame to the binder, a pair of hollow conical frustums, a common longitudinal axis and open at their larger ends and rigidly joined at their smaller and closed ends, vertically adjustable and movable means for pivotally supporting the frustums from the frame, manually regulated means for contacting the frustums with the ground to cause them to rotate on their pivots by the forward movement of the machine and a platform carried by the frame said platform receiving the bundles from the binder to be loaded into the frustums.

7. In a shock former, a frame attached to a grain binder, a member pivotally supported from the frame having diametrically opposite cavities in which sheaves are deposited to form a shock, said member being rotated by contact of its ends with the ground as the binder and frame move forward, and adjustable projections from the ground-contacting portions of said members to secure more positive engagement with the ground.

In witness whereof I have hereunto set my hand and seal at Indianapolis, Indiana, this 20th day of July, A. D. one thousand nine hundred and seventeen.

HARRY BAXTER. [L. S.]